Dec. 29, 1925.  
E. OEHLER  
1,567,748  
DEVICE FOR RELATIVELY PROPPING PISTON ENGINES ON SHIPS  
Filed March 30, 1925

Inventor  
Ernst Oehler

Patented Dec. 29, 1925.

1,567,748

UNITED STATES PATENT OFFICE.

ERNST OEHLER, OF KIEL, GERMANY, ASSIGNOR TO FRIED. KRUPP GERMANIAWERFT AKTIENGESELLSCHAFT, OF KIEL-GAARDEN, GERMANY.

DEVICE FOR RELATIVELY PROPPING PISTON ENGINES ON SHIPS.

Application filed March 30, 1925. Serial No. 19,507.

Be it known that I, ERNST OEHLER, residing at Kiel, Germany, a citizen of the Empire of Germany, have invented a certain new and useful Improvement in Devices for Relatively Propping Piston Engines on Ships, of which the following is a specification.

This invention relates to improvements in machinery plants of ships which include piston engines and in which either two main engines or main and auxiliary engines are arranged one beside the other in the transverse direction of the ship.

In such plants the unbalanced forces of the masses of the main or auxiliary engines as well as the pressures exerted by the crossheads on the frames of the engines produce vibrations of the bottom of the ship and of the foundation of the engines, these vibrations resulting in disturbant oscillations of the engines with relation to one another.

It has been proposed to eliminate the said phenomena by rigidly propping the upper ends of the engines with relation to one another in any suitable manner. This measure indeed obviates the relative oscillations of the engines but it entails the drawback that in case of essential deformations of the bottom of the ship and of the foundation such as are unavoidable, for instance, when docking the ship, the engines cannot follow the movements of the bottom and foundation so that the frames and fastening means of the engines are placed under dangerous stresses.

Now, the invention has for its object to provide a device which securely prevents the oscillations of the engines without, however, possessing the above-mentioned disadvantage. This object is essentially attained by connecting the engines with each other by means of a propping device which is rigid with respect to rapid movements but yieldable with respect to slow movements.

Figure 1:
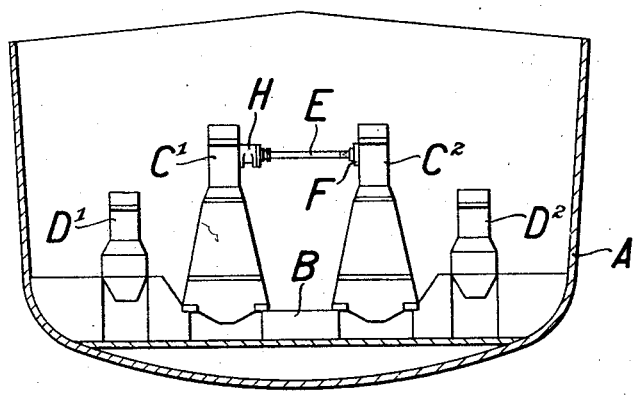
Figure 2:
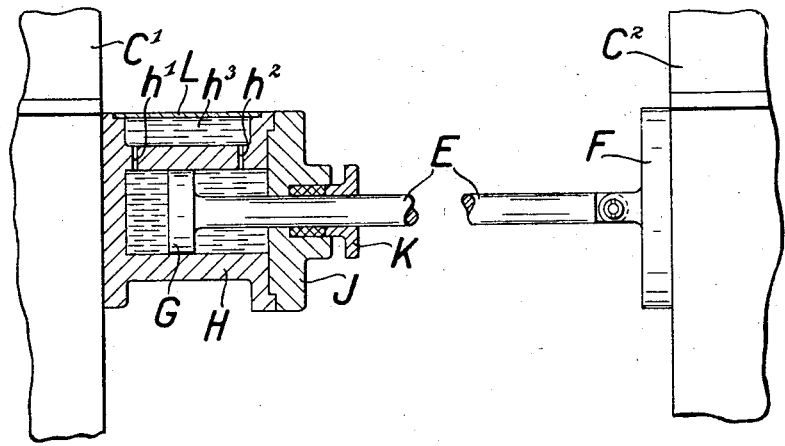

An embodiment of the subject-matter of the invention is illustrated in the accompanying drawing in which:

Fig. 1 is a cross-section through the ship with two propellers and a machinery plant of the kind shown, Fig. 2 is a detail view, on a larger scale, of the prop used to connect the engines.

A designated the outer shell of the ship and B the foundation for the engines. Mounted on the foundation are two main engines $C^1$ and $C^2$ and beside each main engine an auxiliary engine $D^1$ and $D^2$, respectively. The main engines are connected with each other near their upper ends of a prop E. This prop is pivoted by one end to a plate F which is rigidly fastened to the engine $C^2$. The prop E carries at its other end a piston G. This piston slides in a brake cylinder H which is rigidly connected with the engine $C^1$ and into which the rod E extends through a cover J with a stuffing box K. The wall of the cylinder H is provided with two small opens $h^1$ and $h^2$ which connect the interior of the cylinder with a communication chamber $h^3$ closed by a plate L. The cylinder H and the chamber $h^3$ are filled with oil.

The operation of the device is as follows:

If the engine $C^2$ and along with it the piston G in the cylinder H move slowly to the right (for instance in docking the ship), oil passes from the ring-hand cylinder side through the opening $h^2$ into the chamber $h^3$, while at the same time oil is sucked into the left-hand cylinder side through the opening $h^1$. Thus the oil does not impede the movement of the piston. If, however, the same movement of the piston takes place at a high speed, the oil in passing through the narrow openings $h^1$ and $h^2$ will meet with so high a resistance that it exerts a strong braking action on the piston. If the force tending to produce a movement of the piston changes rapidly in different directions such as is the case when the engines oscillate, there will practically be accomplished no measurable movement at all.

It will therefore be understood that the connection of the two engines remains rigid against rapidly changing oscillations while it yields to slow movements, so that the engines are effectively propped with relation to each other when the ship is afloat and moving while they are allowed to follow the movements of the foundation when docking the ship.

Claims:

1. A device for relatively propping parallelly arranged piston engines on ships, consisting of a prop connecting the engines with each other and including means for rendering the prop rigid against rapid movements and yieldable with respect to slow movements.

2. A device for relatively propping parallelly arranged piston engines on ships, comprising a prop arranged between the upper ends of the engines to be propped, said prop consisting of two parts and a liquid brake interposed between the same and adapted to permit of a longitudinal movement of the two parts with relation to each other.

3. A device for relatively propping parallelly arrranged piston engines on ships, comprising a cylinder filled with a braking liquid and fastened to one of the engines, a rod pivoted to the other engine, a piston carried by the free end of the said rod and movable in the said cylinder, narrow inlet and oulet openings in the cylinder wall in front and in rear of the piston, and a communication conduit for the liquid between the two openings.

The foregoing specification signed at Hamburg, Germany, this 9th day of March, 1925.

ERNST OEHLER.